(12) United States Patent
Zhang

(10) Patent No.: US 11,057,765 B2
(45) Date of Patent: Jul. 6, 2021

(54) DECRYPTION METHOD FOR TRUNKING GROUP CALL, AND USER EQUIPMENT

(71) Applicant: Hytera Communications Corporation Limited, Guangdong (CN)

(72) Inventor: Xiangyun Zhang, Shenzhen (CN)

(73) Assignee: HYTERA COMMUNICATIONS CORPORATION LIMITED, Guangdong (CN)

( * ) Notice: Subject to any disclaimer, the term of this patent is extended or adjusted under 35 U.S.C. 154(b) by 203 days.

(21) Appl. No.: 16/476,812

(22) PCT Filed: Jan. 10, 2017

(86) PCT No.: PCT/CN2017/070744
§ 371 (c)(1),
(2) Date: Jul. 9, 2019

(87) PCT Pub. No.: WO2018/129652
PCT Pub. Date: Jul. 19, 2018

(65) Prior Publication Data
US 2019/0364421 A1 Nov. 28, 2019

(51) Int. Cl.
*H04W 12/00* (2021.01)
*H04W 12/033* (2021.01)
(Continued)

(52) U.S. Cl.
CPC ......... *H04W 12/033* (2021.01); *H04L 67/146* (2013.01); *H04M 3/465* (2013.01); *H04W 12/45* (2021.01)

(58) Field of Classification Search
CPC ... H04W 12/033; H04W 36/08; H04W 12/45; H04W 36/02; H04W 12/04; H04W 80/02; H04L 67/146; H04L 12/02; H04M 3/465
See application file for complete search history.

(56) References Cited

U.S. PATENT DOCUMENTS

| 5,745,853 A * | 4/1998 | Hippelainen | ......... H04W 84/08 455/450 |
| 6,097,817 A * | 8/2000 | Bilgic | ..................... H04L 63/08 380/270 |

(Continued)

FOREIGN PATENT DOCUMENTS

| CN | 101729377 A * | 6/2010 | ............. H04L 12/56 |
| CN | 101729377 A | 6/2010 | |

(Continued)

OTHER PUBLICATIONS

First Office Action for Chinese Patent Application No. 201710018664.4 dated Jul. 30, 2019.
(Continued)

*Primary Examiner* — Tongoc Tran
(74) *Attorney, Agent, or Firm* — Calfee, Halter & Griswold LLP

(57) ABSTRACT

The invention provides a decryption method for a trunking group call and a user equipment. The method includes: monitoring group call data in a current cell and obtaining a hyper frame number being a first hyper frame number; when switching from the current cell to a target cell, obtaining the group call data and obtaining an interval range of a hyper frame number of the target cell according to the first hyper frame number, the hyper frame number of the target cell being a second hyper frame number; traversing the second hyper frame number according to the interval range of the second hyper frame number, obtaining a plaintext, and comparing group call session information contained in the plaintext with the group call data of the current cell; and if consistent, decryption by traversing the second hyper frame number being successful, carrying out a decryption operation according to the second hyper frame number.

20 Claims, 4 Drawing Sheets

(51) Int. Cl.
    *H04L 29/08*     (2006.01)
    *H04M 3/46*     (2006.01)
    *H04W 12/45*     (2021.01)

(56) References Cited

U.S. PATENT DOCUMENTS

| | | | |
|---|---|---|---|
| 10,582,475 B2* | 3/2020 | Racz | H04N 21/2385 |
| 2009/0196422 A1* | 8/2009 | An | H04L 63/162 |
| | | | 380/273 |
| 2015/0256335 A1* | 9/2015 | Lin | H04W 12/041 |
| | | | 380/255 |
| 2017/0332351 A1* | 11/2017 | Nebat | H04L 12/1881 |

FOREIGN PATENT DOCUMENTS

| | | |
|---|---|---|
| CN | 101843139 A | 9/2010 |
| CN | 102123460 A | 7/2011 |
| CN | 104041125 A | 9/2014 |
| CN | 104486732 A | 4/2015 |
| CN | 104684030 A | 6/2015 |
| CN | 104853388 A | 8/2015 |
| WO | 2009045160 | 4/2009 |

OTHER PUBLICATIONS

English Translation of International Search Report from PCT/CN2017/070744 dated Sep. 27, 2017 (2 pages).

* cited by examiner

DECRYPTION METHOD FOR TRUNKING GROUP CALL, AND USER EQUIPMENT

CROSS-REFERENCE TO RELATED APPLICATIONS

This application is a 371 of PCT Application No. PCT/CN2017/070744 filed on Jan. 10, 2017, the contents of which are hereby incorporated by reference as if recited in their entirety.

TECHNICAL FIELD

The present invention relates to the field of mobile communication, and in particular, to a decryption method for a trunking group call and a user equipment.

BACKGROUND

After a group call session is initiated, cells in a base station establish a session and apply encryption parameters to send a call code stream. The encryption parameters configured for each cell may be inconsistent and encryption contexts of each cell are not synchronized. Therefore, when a user equipment switches from a current cell to an adjacent target cell, encryption parameters and a state of each cell have to be obtained before decryption can be carried out, resulting in a longer time delay of the group call service interruption.

SUMMARY

The technical problem to be solved by the present invention is to provide a decryption method for a trunking group call and a user equipment, so as to decrease the time delay of the group call service interruption and improve the user experience.

In order to solve the above technical problem, one technical solution adopted by the present invention is: to provide a decryption method for a trunking group call applied to a user equipment, comprising:

monitoring group call data in a current cell and obtaining, from a base station of the current cell, a hyper frame number of the current cell being a first hyper frame number;

when switching from the current cell to a target cell, obtaining the group call data from a base station of the target cell and obtaining an interval range of a hyper frame number of the target cell according to the first hyper frame number, the hyper frame number of the target cell being a second hyper frame number;

traversing the second hyper frame number according to the interval range of the second hyper frame number and obtaining a plaintext according to the second hyper frame number, and comparing group call session information contained in the plaintext with the group call data of the current cell; and if a comparison result is consistent, decryption by traversing the second hyper frame number being successful, carrying out a decryption operation according to the second hyper frame number.

The step of obtaining the group call data from a base station of the target cell and obtaining an interval range of a hyper frame number of the target cell according to the first hyper frame number comprises:

the second hyper frame number being within an interval range of [X−M, X+N], wherein X is the first hyper frame number, and both M and N are natural numbers; and the step of traversing the second hyper frame number according to the interval range of the second hyper frame number and obtaining a plaintext according to the second hyper frame number comprises:

changing a value of the second hyper frame number within the interval range of [X−M, X+N], and carrying out a decryption operation according to the changed value of the second hyper frame number to obtain the plaintext.

The step of decryption by traversing the second hyper frame number being successful, carrying out a decryption operation according to the second hyper frame number comprises:

an order of traversing the second hyper frame number being: X→X−1→X+1→X−2→X+2 . . . →X−M . . . →X+N, When the group call data is configured as PDCP SN 5 bit and a packet interval is 20 ms, M and N are set as 2.

The step of switching from the current cell to a target cell comprises: initiating and establishing a group call session, so that when the base station establishes a trunking service bearer, a field is newly added to carry encryption parameters of the group call data, and the encryption parameters are saved;

when switching the user equipment from the current cell to the target cell, newly adding or multiplexing one signaling to carry a session key identifier of the current cell or to directly carry a key of the current cell; and receiving encrypted group call data of the target cell; and the step of carrying out a decryption operation according to the second hyper frame number comprises:

carrying out the decryption operation on the encrypted group call data of the target cell according to the second hyper frame number.

Before the step of receiving encrypted group call data of the target cell, the method further comprises:

sending the session key identifier of the current cell or the key of the current cell to the base station of the target cell, and comparing, by the base station of the target cell, the session key identifier of the current cell or the key of the current cell with a key of the target cell;

if consistent, receiving the encrypted group call data of the target cell from the base station of the target cell; and if inconsistent, sending the key of the target cell to the base station of the current cell while receiving encrypted group call data of the target cell from the base station of the target cell, and sending, by the base station of the current cell, the key of the target cell to the user equipment.

The step of switching from the current cell to a target cell comprises:

initiating and establishing a group call session, so that when the base station establishes a trunking service bearer, a field is newly added to carry group call encryption parameters, and the group call encryption parameters are saved; and receiving encrypted group call data of the target cell from the base station of the target cell.

In order to solve the above technical problem, one technical solution adopted by the present invention is: to provide a user equipment, comprising:

a monitoring module configured to monitor group call data of the user equipment in a current cell and obtain, from a base station of the current cell, a hyper frame number of the current cell being a first hyper frame number;

a transmitting-receiving module configured to, when switching the user equipment from the current cell to a target cell, receive the group call data from a base station of the target cell and obtain an interval range of a hyper frame number of the target cell according to the first hyper frame number, the hyper frame number of the target cell being a second hyper frame number; and a processing module connected with the monitoring module and the transmitting-receiving module, and configured to traverse the second hyper frame number according to the interval range of the second hyper frame number and obtain a plaintext according to the second hyper frame number, and compare group call session information contained in the plaintext with the group call data of the current cell; and if a comparison result is consistent, decryption by traversing the second hyper frame number being successful, carry out a decryption operation according to the second hyper frame number.

The second hyper frame number is within an interval range of [X−M, X+N], wherein X is the first hyper frame number, and both M and N are natural numbers; and a value of the second hyper frame number is changed within the interval range of [X−M, X+N], and a decryption operation is carried out by the processing module according to the changed value of the second hyper frame number to obtain the plaintext.

An order for the processing module to traverse the second hyper frame number is:
X→X−1→X+1→X−2→X+2 . . . →X+N.

When the group call data is configured as PDCP SN 5 bit and a packet interval is 20 ms, M and N are set as 2.

The user equipment further comprises an establishing module and a key module, wherein when switching the user equipment from the current cell to the target cell, the establishing module initiates and establishes a group call session, so that when the base station establishes a trunking service bearer, a field is newly added to carry encryption parameters of the group call data, and the encryption parameters are saved;

when switching the user equipment from the current cell to the target cell, the key module newly adds or multiplexes one signaling to carry a session key identifier of the current cell or directly carries a key of the current cell;

the transmitting-receiving module receives encrypted group call data of the target cell; and the processing module carries out the decryption operation on the encrypted group call data of the target cell according to the second hyper frame number.

The key module further sends the session key identifier of the current cell or the key of the current cell to the base station of the target cell, and the base station of the target cell compares the session key identifier of the current cell or the key of the current cell with a key of the target cell;

if consistent, the transmitting-receiving module receives the encrypted group call data of the target cell from the base station of the target cell; and if inconsistent, the key of the target cell is sent to the base station of the current cell while encrypted group call data of the target cell is received from the base station of the target cell, and the base station of the current cell sends the key of the target cell to the user equipment.

The user equipment further comprises an establishing module, wherein when switching the user equipment from the current cell to the target cell, the establishing module initiates and establishes a group call session, so that when the base station establishes a trunking service bearer, a field is newly added to carry group call encryption parameters, and the group call encryption parameters are saved; and the transmitting-receiving module receives encrypted group call data of the target cell from the base station of the target cell.

In order to solve the above technical problem, one technical solution adopted by the present invention is: to provide a user equipment, comprising:

a memory configured to store program instructions;

a processor configured to monitor group call data of the user equipment in a current cell and obtain, from a base station of the current cell, a hyper frame number of the current cell being a first hyper frame number;

the processor being further configured to, when switching the user equipment from the current cell to a target cell, receive the group call data from a base station of the target cell and obtain an interval range of a hyper frame number of the target cell according to the first hyper frame number, the hyper frame number of the target cell being a second hyper frame number; and a controller configured to traverse the second hyper frame number according to the interval range of the second hyper frame number and obtain a plaintext according to the second hyper frame number, and compare group call session information contained in the plaintext with the group call data of the current cell; and if a comparison result is consistent, decryption by traversing the second hyper frame number being successful carry out a decryption operation according to the second hyper frame number.

The second hyper frame number is within an interval range of [X−M, X+N], wherein X is the first hyper frame number, and both M and N are natural numbers; and a value of the second hyper frame number is changed within the interval range of [X−M, X+N], and a decryption operation is carried out by the processing module according to the changed value of the second hyper frame number to obtain the plaintext.

An order for the processing module to traverse the second hyper frame number is:
X→X−1→X+1→X−2→X+2 . . . →X−M . . . →X+N;

when the group call data is configured as PDCP SN 5 bit and a packet interval is 20 ms, M and N are set as 2, When switching the user equipment from the current cell to the target cell, the processor initiates and establishes a group call session, so that when the base station establishes a trunking service bearer, a field is newly added to carry encryption parameters of the group call data, and the encryption parameters are saved; and when switching the user equipment from the current cell to the target cell, the processor newly adds or multiplexes one signaling to carry a session key identifier of the current cell or directly carries a key of the current cell;

the processor receives encrypted group call data of the target cell; and the controller carries out the decryption operation on the encrypted group call data of the target cell according to the second hyper frame number.

The processor further sends the session key identifier of the current cell or the key of the current cell to the base station of the target cell, and the base station of the target cell compares the session key identifier of the current cell or the key of the current cell with a key of the target cell;

if consistent, the processor receives the encrypted group call data of the target cell from the base station of the target cell; and if inconsistent, the processor sends the key of the target cell to the base station of the current cell while receiving encrypted group call data of the target cell from the base station of the target cell, and the base station of the current cell sends the key of the target cell to the user equipment.

When switching the user equipment from the current cell to the target cell, the processor initiates and establishes a group call session, so that when the base station establishes a trunking service bearer, a field is newly added to carry group call encryption parameters, and the group call encryption parameters are saved; and the processor receives encrypted group call data of the target cell from the base station of the target cell, The present invention has the beneficial effects that: different from the situation in the prior art, when switching the user equipment from the current cell to the target cell, the decryption method for a trunking group call according to the present invention derives a reasonable interval range of the second hyper frame number of the target cell according to the first hyper frame number of the user equipment in the current cell, traverses the second hyper frame number according to the interval range of the second hyper frame number, carries out traversal decryption according to the second hyper frame number, and carries out a decryption operation according to the second hyper frame number after the decryption is successful, so that the time delay of group call service interruption is decreased, and the user experience is improved.

DETAILED DESCRIPTION

The technical solutions of the various exemplary embodiments provided by the invention will be clearly and completely described below with reference to the accompanying drawings in the embodiments of the invention. It should be noted that, in the absence of conflict, the following embodiments and the features in the embodiments may be mutually combined with each other.

Figure 1:
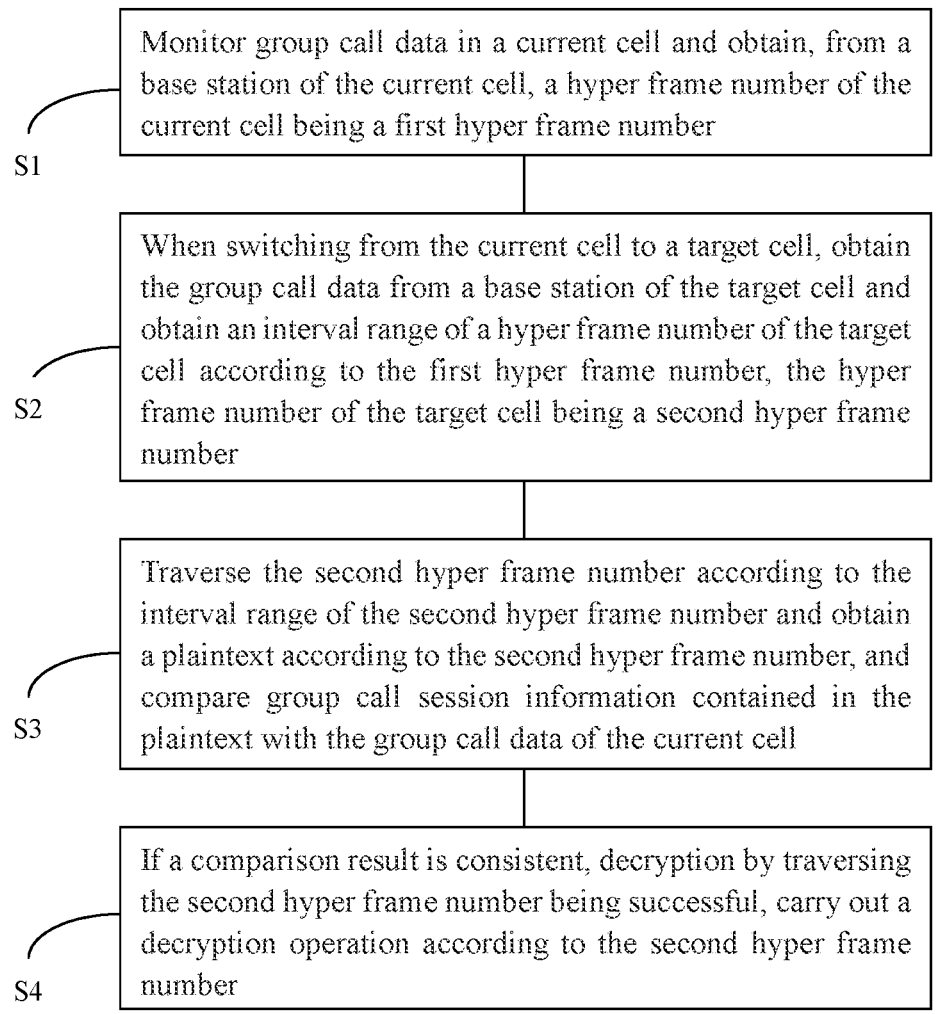
FIG. 1 is a flow chart of a decryption method for a trunking group call according to the present invention.

Referring to FIG. 1, which is a flow chart of a decryption method for a trunking group call according to the present invention. The method disclosed in the embodiment is applied to a user equipment, and the method comprises the following steps.

In step S1, group call data in a current cell is monitored, and a hyper frame number of the current cell being a first hyper frame number is obtained from a base station of the current cell.

Each base station carries out group call data transmission with a plurality of cells. In the embodiment, the current cell and the target cell can carry out group call data transmission with the same base station or with two different base stations. After a group call session is initiated, each cell under the base station establishes the session approximately synchronously, and sends the group call code streams using encryption parameters to ensure that the number and content of the group call code streams in different cells are the same, so Hyper Frame Numbers (HFN) of a Packet Data Convergence Protocol (PDCP) layer will be approximately the same.

In step S2, when switching from the current cell to a target cell, the group call data is obtained from a base station of the target cell and an interval range of a hyper frame number of the target cell is obtained according to the first hyper frame number, the hyper frame number of the target cell being a second hyper frame number.

The second hyper frame number is within an interval range of [X−M, X+N], wherein X is the first hyper frame number, and both M and N are natural numbers.

Figure 2:
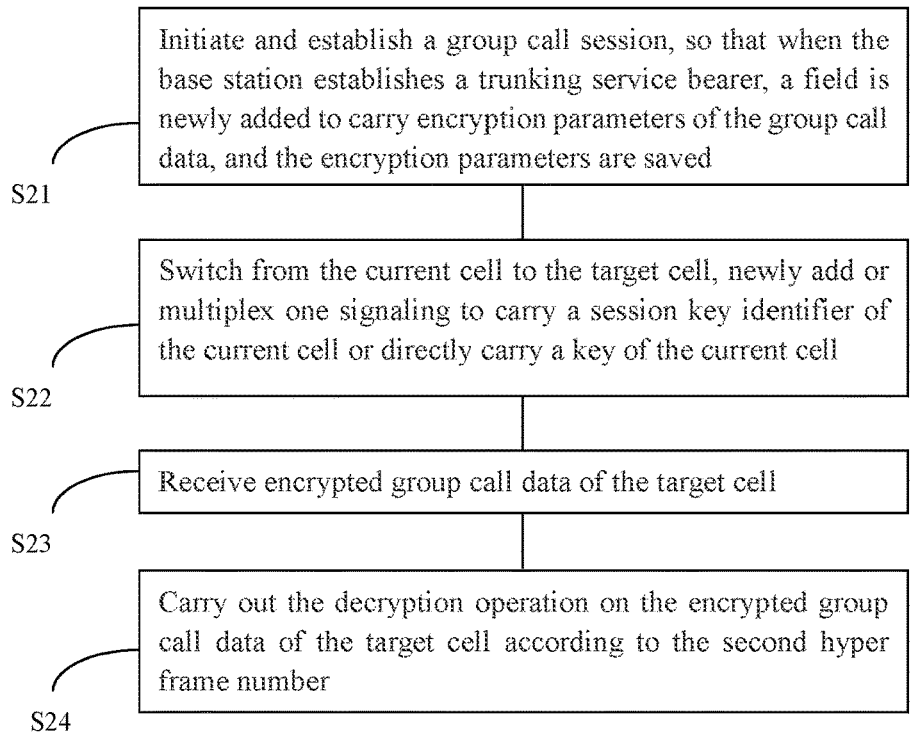
FIG. 2 is a flow chart of a first embodiment of specific steps in FIG. 1.

Referring to FIG. 2, wherein a first embodiment of switching from the current cell to a target cell in the step S2 comprises the following steps.

In step S21, a group call session is initiated and established, so that when the base station establishes a trunking service bearer, a field is newly added to carry encryption parameters of the group call data, and the encryption parameters are saved.

When establishing a group call service as a calling user equipment, a calling user equipment identifier and region range information set by the calling user are obtained, and a first request for establishing a call is sent to a control device, wherein the first request comprises the calling user equipment identifier, a group call service type and the region range information set by the calling user. In this step, it should be noted that the calling user equipment can be a user terminal, a vehicle-mounted terminal, a dispatching console, etc. Moreover, in trunking communication systems with different control modes, the control device can be a control center or a base station.

When receiving a group call establishment request sent by the control device as a called user equipment, the group call establishment request comprising the calling user equipment identifier, the region range information set by the calling user as well as a group identifier and a traffic channel allocated, position information of the called user equipment is obtained and the position information of the called user equipment is judged whether to be within the region range; moreover, when the position information of the called user equipment is within the region range, the called user equipment participates in the group call service and switches to the traffic channel. In this step, it should be noted that in the trunking communication systems with different control modes, the group identifier and the traffic channel can either be allocated by the control center, or by the base station, or one of the group identifier and the traffic channel is allocated by the control center and the other one is allocated by the base station.

In step S22, when switching from the current cell to the target cell, one signaling is newly added or multiplexed to carry a session key identifier of the current cell or directly carry a key of the current cell.

ShortMac-i can be used as the session key identifier.

In step S23, encrypted group call data of the target cell is received.

In step S24, the decryption operation is carried out on the encrypted group call data of the target cell according to the second hyper frame number.

Figure 3:
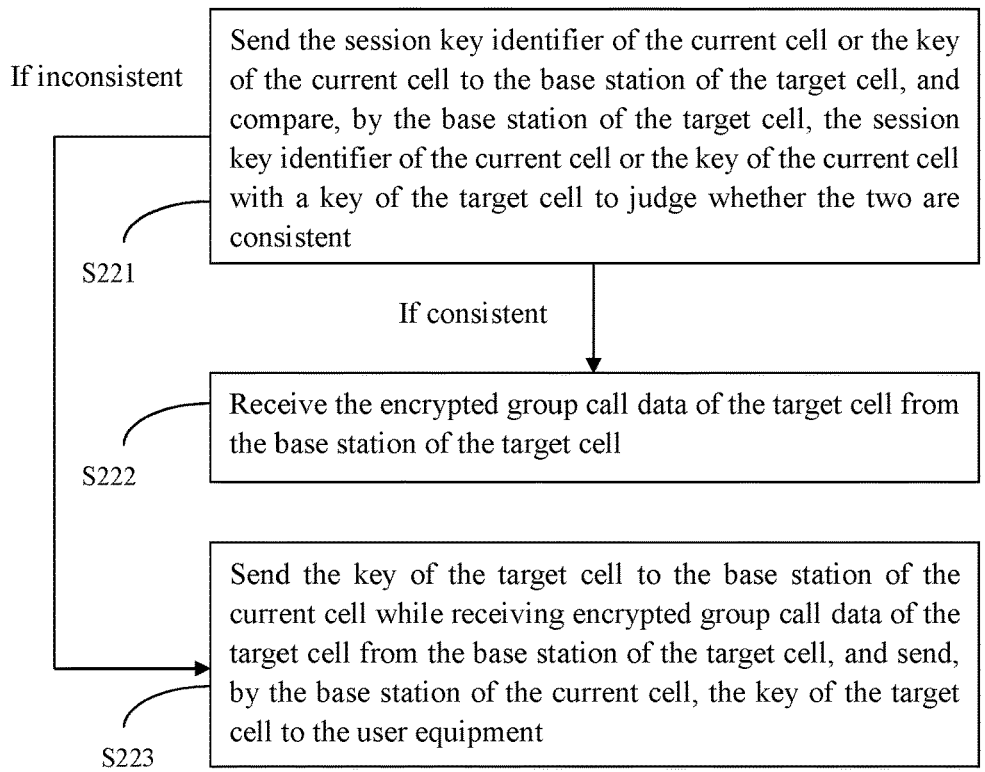
FIG. 3 is a flow chart of specific steps in FIG. 2.

Referring to FIG. 3, wherein between the step S22 and the step S23, the following steps are further included.

In step S221, the session key identifier of the current cell or the key of the current cell is sent to the base station of the target cell, and the base station of the target cell compares the session key identifier of the current cell or the key of the current cell with a key of the target cell to judge whether the two are consistent.

In step S222, if consistent, the encrypted group call data of the target cell is received from the base station of the target cell.

In step S223, if inconsistent, the key of the target cell is sent to the base station of the current cell while receiving encrypted group call data of the target cell from the base station of the target cell, and the base station of the current cell sends the key of the target cell to the user equipment.

In the first embodiment, the user equipment switches from the current cell to the target cell in a connected state.

Figure 4:
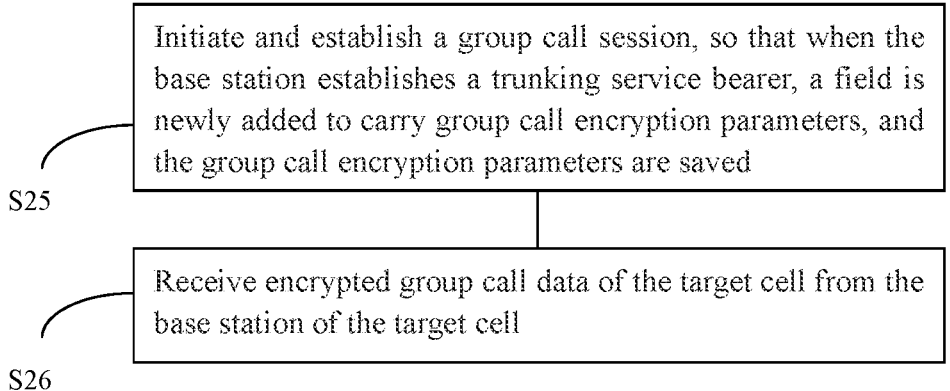
FIG. 4 is a flow chart of a second embodiment of the specific steps in FIG. 1.

Referring to FIG. 4, wherein a second embodiment of switching from the current cell to a target cell in the step S2 comprises the following steps.

In step S25, a group call session is initiated and established, so that when the base station establishes a trunking service bearer, a field is newly added to carry group call encryption parameters, and the group call encryption parameters are saved.

When establishing a group call service as a calling user equipment, a calling user equipment identifier and region range information set by the calling user are obtained, and a first request for establishing a call is sent to a control device, wherein the first request comprises the calling user equipment identifier, a group call service type and the region range information set by the calling user. In this step, it should be noted that the calling user equipment can be a user terminal, a vehicle-mounted terminal, a dispatching console, etc. Moreover, in trunking communication systems with different control modes, the control device can be a control center or a base station.

When receiving a group call establishment request sent by the control device as a called user equipment, the group call establishment request comprising the calling user equipment identifier, the region range information set by the calling user as well as a group identifier and a traffic channel allocated, position information of the called user equipment is obtained and the position information of the called user equipment is judged whether to be within the region range; moreover, when the position information of the called user equipment is within the region range, the called user equipment participates in the group call service and switches to the traffic channel. In this step, it should be noted that in the trunking communication systems with different control modes, the group identifier and the traffic channel can either be allocated by the control center, or by the base station, or one of the group identifier and the traffic channel is allocated by the control center and the other one is allocated by the base station.

In step S26, encrypted group call data of the target cell is received from the base station of the target cell.

In the second embodiment, the user equipment switches from the current cell to the target cell in an idle state.

In step S3, the second hyper frame number is traversed according to the interval range of the second hyper frame number and a plaintext is obtained according to the second hyper frame number, and group call session information contained in the plaintext is compared with the group call data of the current cell.

The obtaining the plaintext according to the second hyper frame number specifically comprises: changing a value of the second hyper frame number within the interval range of [X−M, X+N], and carrying out a decryption operation according to the changed value of the second hyper frame number to obtain the plaintext.

In step S4, if the comparison result is consistent, decryption by traversing the second hyper frame number being successful, a decryption operation is carried out according to the second hyper frame number.

The traversing the second hyper frame number to successfully decrypt specifically comprises: an order of traversing the second hyper frame number being: X→X−1→X+1→X−2→X+2 . . . →X−M . . . →X+N.

In the embodiment, the group call data is preferably configured as PDCP SN 5 bit with a packet interval is 20 ms, where M and N are set as 2, and other group call configurations are set as 1. Of course, the larger the configurations are, the more reliable it is, but the time consumption increases accordingly.

Input parameters for decryption are a hyper frame number, a secret key, a ciphertext block of group call data, an encryption algorithm and other parameters. For different cells, only the hyper frame number may be different, so constant parameters are used to carry out standard decryption process by only changing hyper frame number values to obtain the plaintext, and group call session information contained in the plaintext is compared with a group call context of the user equipment in the current cell. If the comparison result is consistent, the process of traversing the hyper frame number to decrypt is ended, and the hyper frame number value is considered as a valid value, and then the hyper frame number value is maintained for decryption operation.

When switching the user equipment from the current cell to the target cell, the decryption method for a trunking group call derives a reasonable interval range of the second hyper frame number of the target cell according to the first hyper frame number of the user equipment in the current cell, and carries out traversal decryption according to the second hyper frame number, so as to decrease the time delay of group call service interruption, and improve the user experience.

Figure 5:
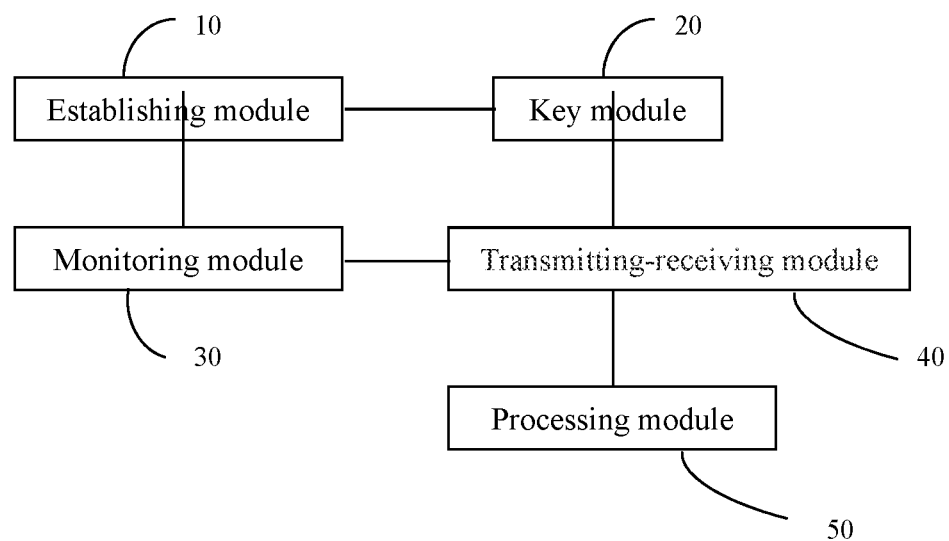
FIG. 5 is a block diagram of a user equipment based on the decryption method for a trunking group call according to the present invention.

Referring to FIG. 5, which is a block diagram of a user equipment based on the decryption method for a trunking group call according to the present invention. The user equipment comprises an establishing module 10, a key module 20, a monitoring module 30, a transmitting-receiving module 40, and a processing module 50.

The monitoring module 30 is configured to monitor group call data of the user equipment in a current cell and obtain, from a base station of the current cell, a hyper frame number of the current cell being a first hyper frame number.

Each base station carries out group call data transmission with a plurality of cells. In the embodiment, the current cell and the target cell can carry out group call data transmission with the same base station or with two different base stations. After a group call session is initiated, each cell under the base station establishes the session approximately synchronously, and sends the group call code streams using encryption parameters to ensure that the number and content of the group call code streams in different cells are the same, so Hyper Frame Numbers (HFN) of a Packet Data Convergence Protocol (PDCP) layer will be approximately the same.

The transmitting-receiving module 40 is configured to, when switching the user equipment from the current cell to a target cell, receive the group call data from a base station of the target cell and obtain an interval range of a hyper frame number of the target cell according to the first hyper frame number, the hyper frame number of the target cell being a second hyper frame number.

The second hyper frame number is within an interval range of [X−M, X+N], wherein X is the first hyper frame number, and both M and N are natural numbers.

A first embodiment of switching from the current cell to a target cell comprises the followings.

The establishing module 10 is configured to initiate and establish a group call session, so that when the base station establishes a trunking service bearer, a field is newly added to carry encryption parameters of the group call data, and the encryption parameters are saved.

When establishing a group call service as a calling user equipment, a calling user equipment identifier and region range information set by the calling user are obtained, and a first request for establishing a call is sent to a control device, wherein the first request comprises the calling user equipment identifier, a group call service type and the region range information set by the calling user. In this step, it should be noted that the calling user equipment can be a user terminal, a vehicle-mounted terminal, a dispatching console, etc. Moreover, in trunking communication systems with different control modes, the control device can be a control center or a base station.

When receiving a group call establishment request sent by the control device as a called user equipment, the group call establishment request comprising the calling user equipment identifier, the region range information set by the calling user as well as a group identifier and a traffic channel allocated, position information of the called user equipment is obtained and the position information of the called user equipment is judged whether to be within the region range; moreover, when the position information of the called user equipment is within the region range, the called user equipment participates in the group call service and switches to the traffic channel. In this step, it should be noted that in the trunking communication systems with different control modes, the group identifier and the traffic channel can either be allocated by the control center, or by the base station, or one of the group identifier and the traffic channel is allocated by the control center and the other one is allocated by the base station.

The key module 20 is configured to, when switching the user equipment from the current cell to the target cell, newly add or multiplex one signaling to carry a session key identifier of the current cell or directly carry a key of the current cell.

ShortMac-i can be used as the session key identifier.

The transmitting-receiving module 40 receives encrypted group call data of the target cell.

The processing module 50 is configured to carry out the decryption operation on the encrypted group call data of the target cell according to the second hyper frame number.

The key module 20 is further configured to send the session key identifier of the current cell or the key of the current cell to the base station of the target cell, and the base station of the target cell compares the session key identifier of the current cell or the key of the current cell with a key of the target cell.

If consistent, the transmitting-receiving module 40 receives the encrypted group call data of the target cell from the base station of the target cell.

If inconsistent, the transmitting-receiving module 40 sends the key of the target cell to the base station of the current cell while receiving encrypted group call data of the target cell from the base station of the target cell, and the base station of the current cell sends the key of the target cell to the user equipment.

In the first embodiment, the user equipment switches from the current cell to the target cell in a connected state.

A second embodiment of switching from the current cell to a target cell comprises the followings.

The establishing module 10 is configured to initiate and establish a group call session, so that when the base station establishes a trunking service bearer, a field is newly added to carry group call encryption parameters, and the group call encryption parameters are saved.

When establishing a group call service as a calling user equipment, a calling user equipment identifier and region range information set by the calling user are obtained, and a first request for establishing a call is sent to a control device, wherein the first request comprises the calling user equipment identifier, a group call service type and the region range information set by the calling user. In this step, it should be noted that the calling user equipment can be a user terminal, a vehicle-mounted terminal, a dispatching console, etc. Moreover, in trunking communication systems with different control modes, the control device can be a control center or a base station.

When receiving a group call establishment request sent by the control device as a called user equipment, the group call establishment request comprising the calling user equipment identifier, the region range information set by the calling user as well as a group identifier and a traffic channel allocated, position information of the called user equipment is obtained and the position information of the called user equipment is judged whether to be within the region range; moreover, when the position information of the called user equipment is within the region range, the called user equipment participates in the group call service and switches to the traffic channel. In this step, it should be noted that in the trunking communication systems with different control modes, the group identifier and the traffic channel can either be allocated by the control center, or by the base station, or one of the group identifier and the traffic channel is allocated by the control center and the other one is allocated by the base station.

The transmitting-receiving module 40 receives the encrypted group call data of the target cell from the base station of the target cell.

In the second embodiment, the user equipment switches from the current cell to the target cell in an idle state.

The processing module 50 is configured to traverse the second hyper frame number according to the interval range of the second hyper frame number and obtain a plaintext according to the second hyper frame number, and compare group call session information contained in the plaintext with the group call data of the current cell.

The obtaining the plaintext according to the second hyper frame number specifically comprises: changing a value of the second hyper frame number within the interval range of [X−M, X+N], and carrying out a decryption operation according to the changed value of the second hyper frame number to obtain the plaintext.

If the comparison result is consistent, decryption by traversing the second hyper frame number with the processing module 50 being successful, carry out a decryption operation according to the second hyper frame number.

The traversing the second hyper frame number to successfully decrypt particularly comprises: an order of traversing the second hyper frame number being: X→X−1→X+1→X−2→X+2 . . . →X−M . . . →X+N.

In the embodiment, the group call data is preferably configured as PDCP SN 5 bit with a packet interval is 20 ms, where M and N are set as 2, and other group call configurations are set as 1. Of course, the larger the configurations are, the more reliable it is, but the time consumption increases accordingly.

Input parameters for decryption are a hyper frame number, a secret key, a ciphertext block of group call data, an encryption algorithm and other parameters. For different cells, only the hyper frame number may be different, so constant parameters are used to carry out standard decryption process by only changing hyper frame number values to obtain the plaintext, and group call session information contained in the plaintext is compared with a group call context of the user equipment in the current cell. If the comparison result is consistent, the process of traversing the hyper frame number to decrypt is ended, and the hyper frame number value is considered as a valid value, and then the hyper frame number value is maintained for decryption operation.

The foregoing modules of the user equipment according to the embodiment of the present invention correspondingly executes the decryption method based on a trunking group call according to the foregoing embodiment, and have the same technical effects as that of the method.

It should be understood that the division of the above modules is a division of logical function, another division manner may be provided during actual implementation, for example, two modules can be integrated into another system, or some of the features can be ignored, or not executed. In addition, the modules can be mutually connected via some interfaces, or connected electrically, or connected by other forms. The above modules may be implemented in the form of software functional blocks or in the form of hardware as shown in FIG. 6.

Figure 6:
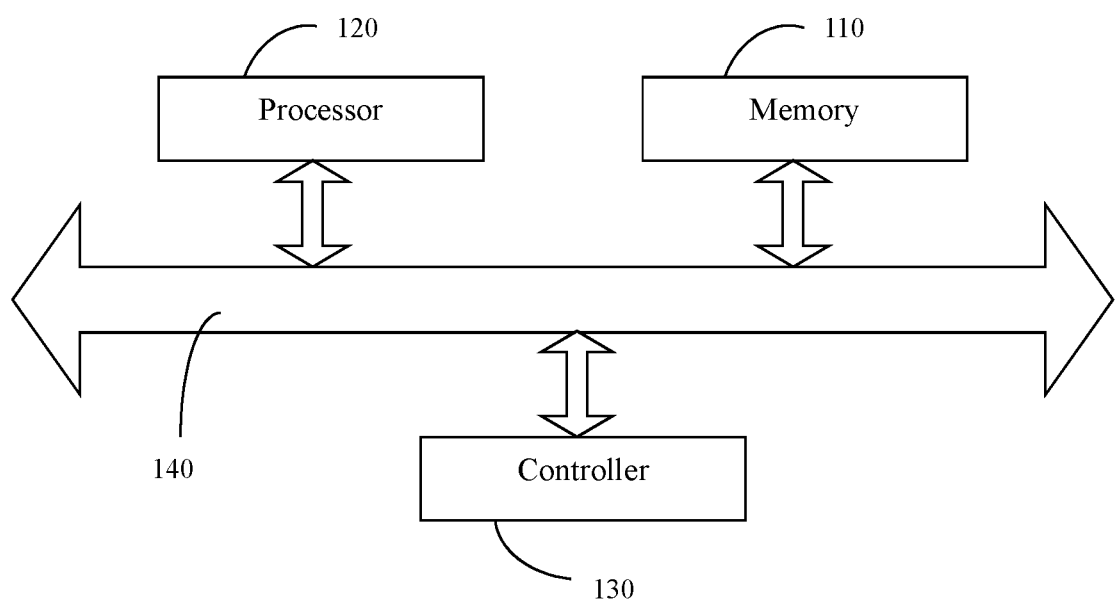
FIG. 6 is a hardware structure diagram of the user equipment based on the decryption method for a trunking group call according to the present invention.

Referring to FIG. 6, which is a hardware structure diagram the user equipment based on the decryption method for a trunking group call according to the present invention. The user equipment comprises a memory 110, a processor 120, a controller 130, and a communication bus 140. The communication bus 140 is used by the processor 120 to call various data, and the memory 110 is used to store program instructions. To facilitate explanation, the number of the processor 120, the memory, 110, the communication bus 140 and the controller 130 as shown in FIG. 6 is one.

The memory 110 stores all program instructions of the establishing module 10, the key module 20, the monitoring module 30, the transmitting-receiving module 40, and the processing module 50.

The processor 120 monitors group call data of the user equipment in a current cell and obtains, from a base station of the current cell, a hyper frame number of the current cell being a first hyper frame number.

Each base station carries out group call data transmission with a plurality of cells. In the embodiment, the current cell and the target cell can carry out group call data transmission with the same base station or with two different base stations. After a group call session is initiated, each cell under the base station establishes the session approximately synchronously, and sends the group call code streams using encryption parameters to ensure that the number and content of the group call code streams in different cells are the same, so Hyper Frame Numbers (HFN) of a Packet Data Convergence Protocol (PDCP) layer will be approximately the same.

When switching the user equipment from the current cell to a target cell, the processor 120 receives the group call data from a base station of the target cell and obtains an interval range of a hyper frame number of the target cell according to the first hyper frame number, the hyper frame number of the target cell being a second hyper frame number.

The second hyper frame number is within an interval range of [X−M, X+N], wherein X is the first hyper frame number, and both M and N are natural numbers.

A first embodiment of switching the user equipment from the current cell to a target cell comprises the followings.

The processor 120 initiates and establishes a group call session, so that when the base station establishes a trunking service bearer, a field is newly added to carry encryption parameters of the group call data, and the encryption parameters are saved.

When establishing a group call service as a calling user equipment, a calling user equipment identifier and region range information set by the calling user are obtained, and a first request for establishing a call is sent to a control device, wherein the first request comprises the calling user equipment identifier, a group call service type and the region range information set by the calling user. In this step, it should be noted that the calling user equipment can be a user terminal, a vehicle-mounted terminal, a dispatching console, etc. Moreover, in trunking communication systems with different control modes, the control device can be a control center or a base station When receiving a group call establishment request sent by the control device as a called user equipment, the group call establishment request comprising the calling user equipment identifier, the region range information set by the calling user as well as a group identifier and a traffic channel allocated, position information of the called user equipment is obtained and the position information of the called user equipment is judged whether to be within the region range; moreover, when the position information of the called user equipment is within the region range, the called user equipment participates in the group call service and switches to the traffic channel. In this step, it should be noted that in the trunking communication systems with different control modes, the group identifier and the traffic channel can either be allocated by the control center, or by the base station, or one of the group identifier and the traffic channel is allocated by the control center and the other one is allocated by the base station.

When switching the user equipment from the current cell to the target cell, the processor 120 newly adds or multiplexes one signaling to carry a session key identifier of the current cell or directly carries a key of the current cell.

ShortMac-i can be used as the session key identifier.

The processor 120 receives encrypted group call data of the target cell.

The controller 130 is configured to carry out the decryption operation on the encrypted group call data of the target cell according to the second hyper frame number.

The processor 120 further sends the session key identifier of the current cell or the key of the current cell to the base station of the target cell, and the base station of the target cell compares the session key identifier of the current cell or the key of the current cell with a key of the target cell.

If consistent, the processor 120 receives the encrypted group call data of the target cell from the base station of the target cell.

If inconsistent, the processor 120 sends the key of the target cell to the base station of the current cell while receiving encrypted group call data of the target cell from the base station of the target cell, and the base station of the current cell sends the key of the target cell to the user equipment.

In the first embodiment, the user equipment switches from the current cell to the target cell in a connected state.

A second embodiment of switching the user equipment from the current cell to a target cell comprises the followings.

The processor 120 initiates and establishes a group call session, so that when the base station establishes a trunking service bearer, a field is newly added to carry group call encryption parameters, and the group call encryption parameters are saved.

When establishing a group call service as a calling user equipment, a calling user equipment identifier and region range information set by the calling user are obtained, and a first request for establishing a call is sent to a control device, wherein the first request comprises the calling user equipment identifier, a group call service type and the region range information set by the calling user. In this step, it should be noted that the calling user equipment can be a user terminal, a vehicle-mounted terminal, a dispatching console, etc. Moreover, in trunking communication systems with different control modes, the control device can be a control center or a base station When receiving a group call establishment request sent by the control device as a called user equipment, the group call establishment request comprising the calling user equipment identifier, the region range information set by the calling user as well as a group identifier and a traffic channel allocated, position information of the called user equipment is obtained and the position information of the called user equipment is judged whether to be within the region range; moreover, when the position information of the called user equipment is within the region range, the called user equipment participates in the group call service and switches to the traffic channel. In this step, it should be noted that in the trunking communication systems with different control modes, the group identifier and the traffic channel can either be allocated by the control center, or by the base station, or one of the group identifier and the traffic channel is allocated by the control center and the other one is allocated by the base station.

The processor 120 receives encrypted group call data of the target cell from the base station of the target cell.

In the second embodiment, the user equipment switches from the current cell to the target cell in an idle state.

The controller 130 is configured to traverse the second hyper frame number according to the interval range of the second hyper frame number and obtain a plaintext according to the second hyper frame number, and compare group call session information contained in the plaintext with the group call data of the current cell.

The obtaining the plaintext according to the second hyper frame number specifically comprises: changing a value of the second hyper frame number within the interval range of [X−M, X+N], and carrying out a decryption operation according to the changed value of the second hyper frame number to obtain the plaintext.

If the comparison result is consistent, decryption by traversing the second hyper frame number with the controller 130 being successful, carry out a decryption operation according to the second hyper frame number.

The traversing the second hyper frame number to successfully decrypt specifically comprises: an order of traversing the second hyper frame number being: X→X−1→X+1→X−2→X+2 . . . →X−M . . . →X+N.

In the embodiment, the group call data is preferably configured as PDCP SN 5 bit with a packet interval is 20 ms, where M and N are set as 2, and other group call configurations are set as 1. Of course, the larger the configurations are, the more reliable it is, but the time consumption increases accordingly.

Input parameters for decryption are a hyper frame number, a secret key, a ciphertext block of group call data, an encryption algorithm and other parameters. For different cells, only the hyper frame number may be different, so constant parameters are used to carry out standard decryption process by only changing hyper frame number values to obtain the plaintext, and group call session information contained in the plaintext is compared with a group call context of the user equipment in the current cell. If a comparison result is consistent, the process of traversing the hyper frame number to decrypt is ended, and the hyper frame number value is considered as a valid value, and then the hyper frame number value is maintained for decryption operation.

When switching the user equipment from the current cell to the target cell, the decryption method for a trunking group call derives a reasonable interval range the second hyper frame number of the target cell according to the first hyper frame number of the user equipment in the current cell, traverses the second hyper frame number according to the interval range of the second hyper frame number, carries out traversal decryption according to the second hyper frame number, and carries out a decryption operation according to the second hyper frame number after the decryption is successful, so that the time delay of group call service interruption is decreased, and the user experience is improved.

The foregoing descriptions are merely embodiments of the invention, but are not intended to limit the patent scope of the invention. All equivalent structures or equivalent flow transformations made using the description of the invention and the accompanying drawings, or being used directly or indirectly in other related technical fields, are similarly included in the protection scope of the invention.

The invention claimed is:

1. A decryption method for a trunking group call applied to a user equipment, comprising:
    monitoring group call data in a current cell and obtaining, from a base station of the current cell, a hyper frame number of the current cell being a first hyper frame number;
    when switching from the current cell to a target cell, obtaining the group call data from a base station of the target cell and obtaining an interval range of a hyper frame number of the target cell according to the first hyper frame number, the hyper frame number of the target cell being a second hyper frame number;
    traversing the second hyper frame number according to the interval range of the second hyper frame number and obtaining a plaintext according to the second hyper frame number, and comparing group call session information contained in the plaintext with the group call data of the current cell; and
    if a comparison result is consistent, decryption by traversing the second hyper frame being successful, carrying out a decryption operation according to the second hyper frame number.

2. The decryption method for a trunking group call according to claim 1, wherein the step of obtaining the group call data from a base station of the target cell and obtaining an interval range of a hyper frame number of the target cell according to the first hyper frame number comprises:

the second hyper frame number being within an interval range of [X−M, X+N], wherein X is the first hyper frame number, and both M and N are natural numbers; and the step of traversing the second hyper frame number according to the interval range of the second hyper frame number and obtaining a plaintext according to the second hyper frame number comprises:

changing a value of the second hyper frame number within the interval range of [X−M, X+N], and carrying out a decryption operation according to the changed value of the second hyper frame number to obtain the plaintext.

3. The decryption method for a trunking group call according to claim 2, wherein the step of decryption by traversing the second hyper frame number being successful, carrying out a decryption operation according to the second hyper frame number comprises:

an order of traversing the second hyper frame number being: X→X−1→X+1→X−2→X+2 . . . →X−M . . . →X+N.

4. The decryption method for a trunking group call according to claim 2, wherein w the group call data is configured as PDCP SN 5 bit and a packet interval is 20 ms, M and N are set as 2.

5. The decryption method for a trunking group call according to claim 1, wherein the step of switching from the current cell to a target cell comprises:

initiating and establishing a group call session, so that when the base station establishes a trunking service bearer, a field is newly added to carry encryption parameters of the group call data, and the encryption parameters are saved;

switching from the current cell to the target cell, newly adding or multiplexing one signaling to carry a session key identifier of the current cell or directly carrying a key of the current cell; and receiving encrypted group call data of the target cell; and the step of carrying out a decryption operation according to the second hyper frame number comprises:

carrying out the decryption operation on the encrypted group call data of the target cell according to the second hyper frame number.

6. The decryption method for a trunking group call according to claim 5, wherein before the step of receiving encrypted group call data of the target cell, the method further comprises:

sending the session key identifier of the current cell or the key of the current cell to the base station of the target cell, and comparing, by the base station of the target cell, the session key identifier of the current cell or the key of the current cell with a key of the target cell;

if consistent, receiving the encrypted group call data of the target cell from the base station of the target cell; and if inconsistent, sending the key of the target cell to the base station of the current cell while receiving encrypted group call data of the target cell from the base station of the target cell, and sending, by the base station of the current cell, the key of the target cell to the user equipment.

7. The decryption method for a trunking group call according to claim 1, wherein the step of switching from the current cell to a target cell comprises:

initiating and establishing a group call session, so that when the base station establishes a trunking service bearer, a field is newly added to carry group call encryption parameters, and the group call encryption parameters are saved; and receiving encrypted group call data of the target cell from the base station of the target cell.

8. A user equipment, comprising:

a monitoring module configured to monitor group call data of the user equipment in a current cell and obtain, from a base station of the current cell, a hyper frame number of the current cell being a first hyper frame number;

a transmitting-receiving module configured to, when switching the user equipment from the current cell to a target cell, receive the group call data from a base station of the target cell and obtain an interval range of a hyper frame number of the target cell according to the first hyper frame number, the hyper frame number of the target cell being a second hyper frame number; and a processing module connected with the monitoring module and the transmitting-receiving module, and configured to traverse the second hyper frame number according to the interval range of the second hyper frame number and obtain a plaintext according to the second hyper frame number, and compare group call session information contained in the plaintext with the group call data of the current cell; and if a comparison result is consistent, decryption by traversing the second hyper frame number being successful, carry out a decryption operation according to the second hyper frame number.

9. The user equipment according to claim 8, wherein the second hyper frame number is within an interval range of [X−M, X+N], X is the first hyper frame number, and both M and N are natural numbers; and a value of the second hyper frame number is changed within the interval range of [X−M, X+N], and a decryption operation is carried out by the processing module according to the changed value of the second hyper frame number to obtain the plain text.

10. The user equipment according to claim 9, wherein an order for the processing module to traverse the second hyper frame number is:

X→X−1→X+1→X−2→X+2 . . . →X+M . . . →X+N.

11. The user equipment according to claim 10, wherein when the group call data is configured as PDCP SN 5 bit and a packet interval is 20 ms, M and N are set as 2.

12. The user equipment according to claim 9, further comprising an establishing module and a key module, wherein when switching the user equipment from the current cell to the target cell, the establishing module initiates and establishes a group call session, so that when the base station establishes a trunking service bearer, a field is newly added to carry encryption parameters of the group call data, and the encryption parameters are saved;

when switching the user equipment from the current cell to the target cell, the key module newly adds or multiplexes one signaling to carry a session key identifier of the current cell or directly carries a key of the current cell;

the transmitting-receiving module receives encrypted group call data of the target cell; and the processing module carries out the decryption operation on the encrypted group call data of the target cell according to the second hyper frame number.

13. The user equipment according to claim 12, wherein the key module further sends the session key identifier of the current cell or the key of the current cell to the base station of the target cell, and the base station of the target cell compares the session key identifier of the current cell or the key of the current cell with a key of the target cell;
    if consistent, the transmitting-receiving module receives the encrypted group call data of the target cell from the base station of the target cell; and
    if inconsistent, the key of the target cell is sent to the base station of the current cell while encrypted group call data of the target cell is received from the base station of the target cell, and the base station of the current cell sends the key of the target cell to the user equipment.

14. The user equipment according to claim 8, further comprising an establishing module, wherein when switching the user equipment from the current cell to the target cell, the establishing module initiates and establishes a group call session, so that when the base station establishes a trunking service bearer, a field is newly added to carry encryption parameters of the group call data, and the encryption parameters are saved; and
    the transmitting-receiving module receives encrypted group call data of the target cell from the base station of the target cell.

15. A user equipment, comprising:
    a memory configured to store program instructions;
    a processor configured to monitor group call data of the user equipment in a current cell and obtain, from a base station of the current cell, a hyper frame number of the current cell being a first hyper frame number;
    the processor being further configured to, when switching the user equipment from the current cell to a target cell, receive the group call data from a base station of the target cell and obtain an interval range of a hyper frame number of the target cell according to the first hyper frame number, the hyper frame number of the target cell being a second hyper frame number; and
    a controller configured to traverse the second hyper frame number according to the interval range of the second hyper frame number and obtain a plaintext according to the second hyper frame number, and compare group call session information contained in the plaintext with the group call data of the current cell; and if a comparison result is consistent, decryption by traversing the second hyper frame number being successful, carry out a decryption operation according to the second hyper frame number.

16. The user equipment according to claim 15, wherein the second hyper frame number is within an interval range of [X−M, X+N], X is the first hyper frame number, and both M and N are natural numbers; and a value of the second hyper frame number is changed within the interval range of [X−M, X+N], and a decryption operation is carried out by the processing module according to the changed value of the second hyper frame number to obtain the plaintext.

17. The user equipment according to claim 16, wherein an order for the processing module to traverse the second hyper frame number is:
    X→X−1→X+1→X−2→X+2 . . . →X−M . . . →X+N; and
    when the group call data is configured as PDCP SN 5 bit and a packet interval is 20 ms, M and N are set as 2.

18. The user equipment according to claim 15, wherein when switching the user equipment from the current cell to the target cell, the processor initiates and establishes a group call session, so that when the base station establishes a trunking service bearer, a field is newly added to carry encryption parameters of the group call data, and the encryption parameters are saved;
    when switching the user equipment from the current cell to the target cell, the processor newly adds or multiplexes one signaling to carry a session key identifier of the current cell or directly carries a key of the current cell;
    the processor receives encrypted group call data of the target cell; and
    the controller carries out the decryption operation on the encrypted group call data of the target cell according to the second hyper frame number.

19. The user equipment according to claim 18, wherein the processor further sends the session key identifier of the current cell or the key of the current cell to the base station of the target cell, and the base station of the target cell compares the session key identifier of the current cell or the key of the current cell with a key of the target cell;
    if consistent, the processor receives the encrypted group call data of the target cell from the base station of the target cell; and
    if inconsistent, the processor sends the key of the target cell to the base station of the current cell while receiving encrypted group call data of the target cell from the base station of the target cell, and the base station of the current cell sends the key of the target cell to the user equipment.

20. The user equipment according to claim 15, wherein when switching the user equipment from the current cell to the target cell, the processor initiates and establishes a group call session, so that when the base station establishes a trunking service bearer, a field is newly added to carry group call encryption parameters, and the group call encryption parameters are saved; and
    the processor receives encrypted group call data of the target cell from the base station of the target cell.

\* \* \* \* \*